United States Patent
Li et al.

(10) Patent No.: US 7,539,755 B2
(45) Date of Patent: May 26, 2009

(54) REAL-TIME HEARTBEAT FREQUENCY REGULATION SYSTEM AND METHOD UTILIZING USER-REQUESTED FREQUENCY

(75) Inventors: Sheng Li, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 640 days.

(21) Appl. No.: 11/408,953

(22) Filed: Apr. 24, 2006

(65) Prior Publication Data

US 2007/0250619 A1  Oct. 25, 2007

(51) Int. Cl.
 *G06F 15/173* (2006.01)
(52) U.S. Cl. ............... 709/225; 714/11; 714/13
(58) Field of Classification Search .......... 709/225; 714/11, 13
 See application file for complete search history.

(56) References Cited

U.S. PATENT DOCUMENTS

| | | | |
|---|---|---|---|
| 6,370,656 B1 * | 4/2002 | Olarig et al. ............ | 714/23 |
| 6,460,149 B1 * | 10/2002 | Rowlands et al. ......... | 714/43 |
| 6,502,203 B2 * | 12/2002 | Barron et al. ............ | 714/4 |
| 6,609,213 B1 * | 8/2003 | Nguyen et al. ............ | 714/4 |
| 6,651,242 B1 * | 11/2003 | Hebbagodi et al. ........ | 717/127 |
| 6,928,589 B1 * | 8/2005 | Pomaranski et al. ....... | 714/47 |
| 7,062,676 B2 * | 6/2006 | Shinohara et al. ......... | 714/15 |
| 7,275,100 B2 * | 9/2007 | Yamagami ............... | 709/224 |
| 7,284,147 B2 * | 10/2007 | Rao et al. ................ | 714/4 |
| 7,287,180 B1 * | 10/2007 | Chen et al. ............... | 714/4 |
| 7,447,940 B2 * | 11/2008 | Peddada ................... | 714/11 |
| 7,451,359 B1 * | 11/2008 | Coekaerts ................. | 714/48 |
| 7,467,322 B2 * | 12/2008 | Baba ....................... | 714/4 |

* cited by examiner

*Primary Examiner*—David Y Eng
(74) *Attorney, Agent, or Firm*—Muncy, Geissler, Olds & Lowe, PLLC

(57) ABSTRACT

A system and method for regulating real-time the heartbeat frequency of the host according to the user-requested frequency, wherein the heartbeat frequency of the host is regulated through the service request signal sent from the user's end to the host by making use of a cluster system comprising a host and a backup host. Firstly, a frequency correspondence table is established. The host and the backup host transmit signals to each other at a predetermined frequency, which is set to the most recent heartbeat frequency of the host. Then the transmitting times of a plurality of service request signals are recorded to calculate the frequency of the most recent service request signal. Finally, the most recent heartbeat frequency of the host and the frequency of the most recent service request signal are compared to determine if the heartbeat frequency of the host needs to be regulated.

11 Claims, 4 Drawing Sheets

| state | frequency range of service request signal (times / second) | current heartbeat frequency (times / second) |
|---|---|---|
| 1 | 701~1000 | 850 |
| 2 | 301~700 | 500 |
| 3 | 101~300 | 200 |
| 4 | 1~100 | 50 |

Fig. 3

REAL-TIME HEARTBEAT FREQUENCY REGULATION SYSTEM AND METHOD UTILIZING USER-REQUESTED FREQUENCY

FIELD OF THE INVENTION

The invention relates to a heartbeat frequency regulation system and method, and in particular to a heartbeat frequency regulation system and method that is capable of providing the required host heartbeat frequency real-time at the request of the user.

RELATED ART

In today's age of science and technology, computer technology is currently widely utilized. As such, the computer is required to provide real-time service and information to various applications, and in many instances, the application programs of the computer must be run 24 hours a day without any interruption, such as those utilized in Web servers, industrial controllers, ATMs, remote communication relays, medical and military monitors and stock exchange machines. To these application programs, any temporary downtime will lead to the loss of crucial data and catastrophic consequences. The continuous and reliable operation of the server is the key to ensure the normal operation of the entire system. Thus stringent requirements are stipulated for the hardware and software of the system. The Cluster System has been developed to meet these requirements. It includes a host and backup host computers. When the backup host is unable to receive the heartbeat from the host for a predetermined interval of time, then it determines that the host is in a machine-down state, and thus the backup host takes over the operation of the host.

Usually, the heartbeat frequency of the Cluster System is set and controlled manually by the user, and it is not capable of being regulated real-time automatically according to the existing operation conditions of the system. Thus when the frequency of service request signals from the user increases while the host is down, then the response time is delayed for the backup host to take over the operation of the host. As such, the repeated service request signals of the user cannot get a timely response, thus resulting in the shut down of the entire system. Therefore, the most urgent task in this field is the research and development of a system and method allowing for the response time of the backup host taking over the operation of the malfunctioning host to be significantly reduced depending on the operation environments of the system.

SUMMARY OF THE INVENTION view of the above-mentioned problems of the prior art, the objective of the invention is to provide a system and method that allows the heartbeat frequency of the host to be adjusted real time according to the frequency requested by the user. The host and backup host are kept in touch with each other through the heartbeats transmitted between each other at pre-determined regular time intervals, thus the heartbeat frequency of the host can be regulated according to the request of the user. Once the host is out of operation, the backup host can take over the operation of the host with a faster response time, thus solving the problem of the prior art.

To achieve the above-mentioned objective, the invention discloses a method for regulating real-time the heartbeat frequency of the host according to the user's request by making use of a Cluster System, including a host and a backup host, which are kept in touch with each other through the heartbeats transmitted between them, so that the frequency of heartbeat of the host can be regulated by a service request signal sent from the user's end. The method includes the following steps.

(A) Establishing a frequency correspondence table;
(B) Setting the heartbeat frequency of the host to the most recent heartbeat frequency so that signals are transmitted at the most recent heartbeat frequency between the host and backup host;
(C) Recording the number of times of transmission of a plurality of service request signals, and calculating the frequency of the most recent service request signal;
(D) Checking through the frequency correspondence table; when the most recent heartbeat frequency and the frequency of the most recent service request signal are not in the same state as shown in the frequency correspondence table, then a synchronization signal is transmitted from the host to the backup host;
(E) Upon certifying the receipt of the synchronization signal by the backup host, transmitting a certified regulation signal back to the host; and
(F) Regulating by the host and backup host synchronously the most recent heartbeat frequency to the current heartbeat frequency corresponding to the frequency range of the most recent service request signal as shown in the frequency correspondence table.

In addition, the invention provides a system for regulating real-time the heartbeat frequency of the host according to the user's request by making use of a Cluster System, including a host and a backup host, wherein the host comprises:

A storage module, used to store a frequency correspondence table;

A first heartbeat transmission/reception module, used to generate and transmit/receive a heartbeat, so the predetermined frequency of the heartbeat is set to the most recent heartbeat frequency;

A service request signal reception module, used to receive a plurality of service request signals transmitted by the user;

A recording module, used to record the transmitting times of a plurality of service request signals;

A calculation module, used to calculate the frequency of the most recent service request signal based on the recorded transmission times of the plurality of service request signals;

A comparison module, used to compare the frequency of the most recent heartbeat to the frequency of the most recent service request signal;

A first signal synchronization module, used to transmit a synchronization signal to the backup host when the frequency of the most recent heartbeat and the frequency of the most recent service request signal are not in the same state as shown in the frequency correspondence table; and A first processing module, used to regulate the most recent heartbeat frequency to the current heartbeat frequency corresponding to the frequency range of the most recent service request signal as shown in the frequency correspondence table.

The backup host comprises:

A second heartbeat transmission/reception module, used to receive the heartbeat transmitted from the first heartbeat transmission/reception module, and then transmit the heartbeat back to the first heartbeat transmission/reception module, thus making the backup host keep in contact with the host;

A second signal synchronization module, used to receive the synchronization signal transmitted from the first signal synchronization module, and transmit a certified regulation signal; and A second processing module, used to regulate synchronously with the first processing module the most recent heartbeat frequency, so that the frequencies of heartbeats transmitted and received by the first heartbeat transmission/reception module and the second heartbeat transmission/reception module are identical.

Further scope of the applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given below, which is for illustration only and thus is not limitative of the invention.

FIG. 3 is a frequency correspondence table used in regulating the frequency of the heartbeat of the host based on the frequency requested by the user.

DETAILED DESCRIPTION OF THE INVENTION

The purpose, construction, features, and functions of the invention can be appreciated and understood more thoroughly through the following detailed description with reference to the attached drawings.

Figure 1A:
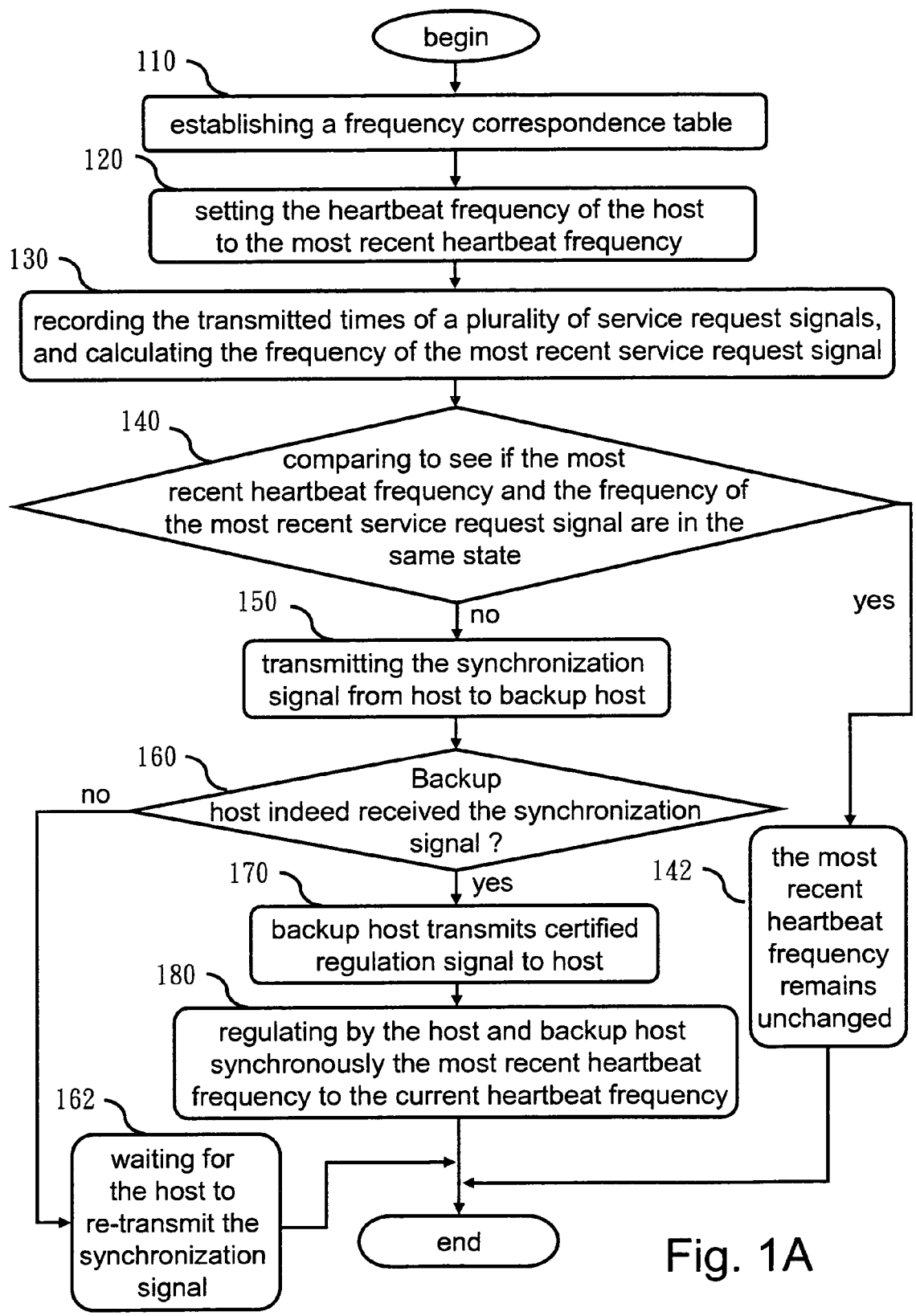
FIG. 1a is a system flow chart of a method for regulating real-time the heartbeat frequency of the host based on the frequency requested by the user according to an embodiment of the invention.
Figure 1B:
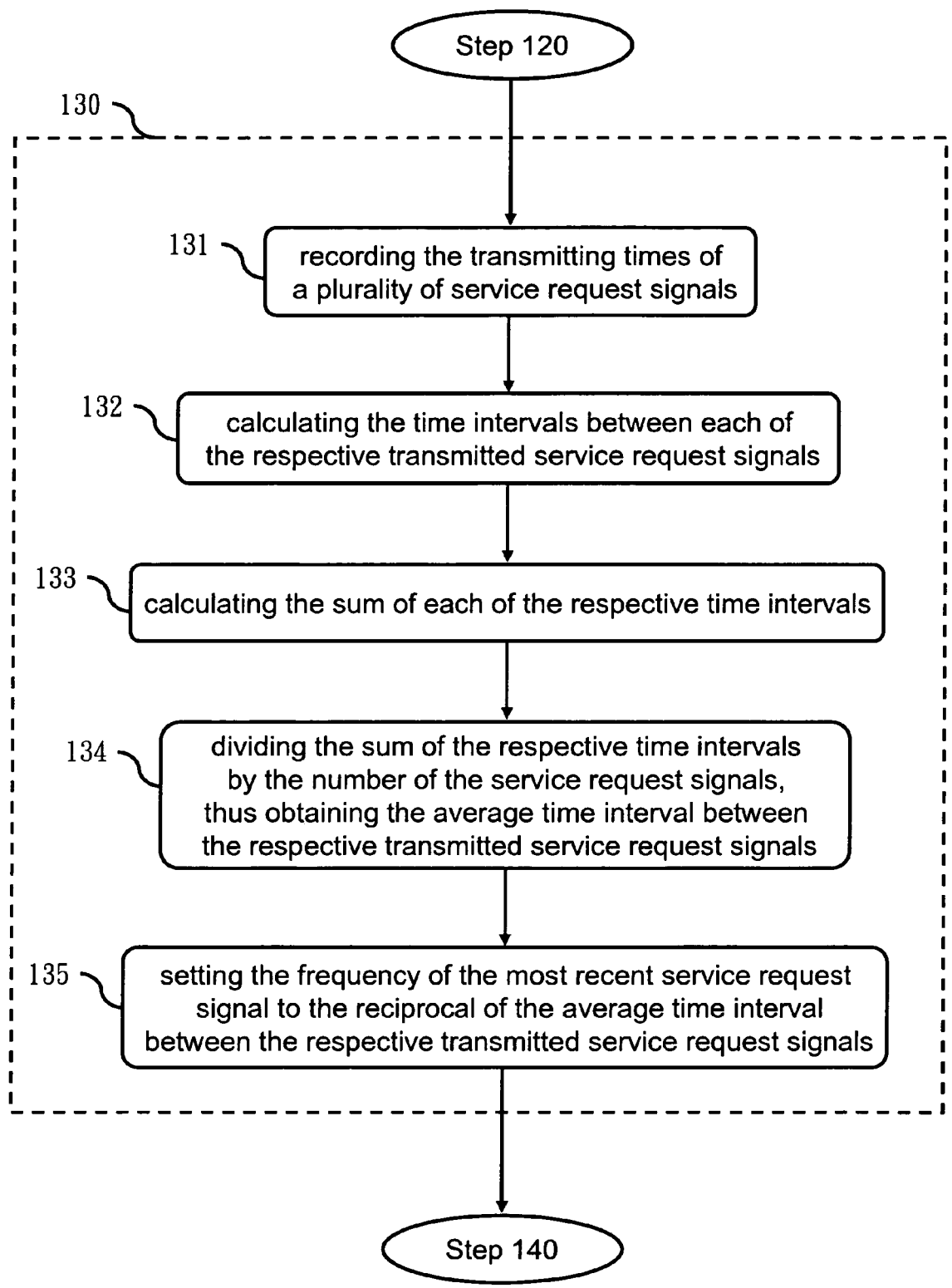
FIG. 1b is a flowchart of steps contained in step 130 of FIG. 1A utilized in recording the transmitting times of a plurality of service request signals and calculating the frequency of the most recent service request signal.

Refer to FIGS. 1A and 1B for the system flowcharts of a method of regulating real-time the heartbeat frequency of the host according to the user's request by making use of a Cluster System, including a host and a backup host, which are kept in touch with each other through the signals transmitted between them, so that the heartbeat frequency of the host can be regulated by a service request signal sent from the user's end. The details of the respective steps are described as follows.

Firstly, establishing a frequency correspondence table (step 110), which is composed of a plurality of rows each representing a respective state, with each state containing the frequency range of a service request signal and a corresponding current heartbeat frequency of the host. Thus, when the frequency of a service request signal is in the frequency range of a service request signal, then the heartbeat frequency of the host is set to the current heartbeat frequency.

Next, setting the heartbeat frequency to the most frequent heartbeat frequency (step 120). This is done manually by the user, so the signals are transmitted between the host and the backup host at this frequency.

Then, recording the transmitting times of a plurality of service request signals, thus calculating and obtaining the frequency of the most recent service request signal (step 130).

In the above-mentioned steps, the step of calculating and obtaining the frequency of the most recent service request signal (step 130) further including the following steps:

(a) Recording the transmitting times of a plurality of service request signals (step 131);

(b) Calculating the time intervals between each of the respective transmitted service request signals (step 132);

(c) Calculating the sum of each of the respective time intervals;

(d) Dividing the sum of the respective time intervals by the numbers of the service request signals, thus obtaining the average time interval between the respective transmitted service request signals (step 134); and (e) Setting the frequency of the most recent service request signal to the reciprocal of the average time interval between the respective transmitted service request signals obtained above (step 135).

Subsequently, comparing and checking if the most recent heartbeat frequency of the host and the frequency of the most recent service request signal belong to the same state (step 140). If the answer if negative, then a synchronization signal is transmitted from the host to the backup host (step 150). However, if the answer if affirmative, then the most recent heartbeat frequency of the host remains unchanged (step 142).

Then, upon transmitting the synchronization signal from the host to the backup host (step 150), the backup host determines if it has received the synchronization signal. If the answer if affirmative, a verified regulation signal is transmitted back to the host (step 170). However, if the answer if negative, then the backup host waits for the transmission of another synchronization signal from the host (step 162). Finally, the most recent heartbeat frequency of the host is set to the current heartbeat frequency according to the frequency correspondence table by the host and backup host synchronously (step 180).

Figure 2:
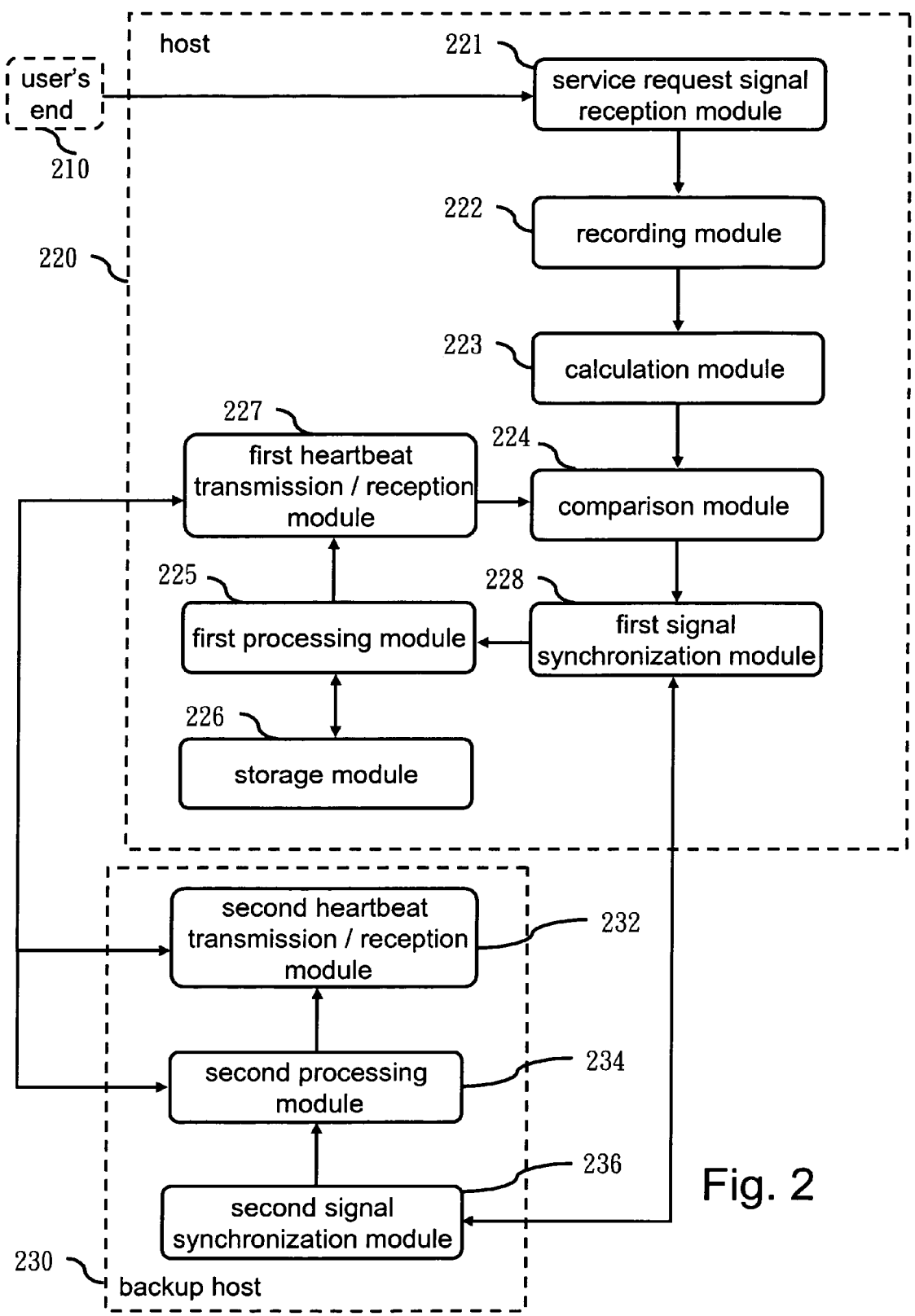
FIG. 2 is a system block diagram of the system of a host and a backup host for regulating real-time the heartbeat frequency of the host based on the frequency requested by the user according to an embodiment of the invention.

For further description of the invention, refer to FIG. 2, which shows a system block diagram of a host and a backup host for regulating real-time the frequency of the heartbeat of the host based on the frequency requested by the user according to an embodiment of the invention. In practice, the system of the invention is a cluster system, including a host 220 and a backup host 230.

The host 220 includes a storage module 226, a first heartbeat transmission/reception module 227, a service request signal reception module 221, a recording module 222, a calculation module 223, a comparison module 224, a first signal synchronization module 228, and a first processing module 225. The functions of each of these modules are described in detail as follows.

The storage module 226 is used to store a frequency correspondence table, which is composed of a plurality of rows each representing a respective state, with each state containing the frequency range of a service request signal and a corresponding current heartbeat frequency of the host. The storage module 226 is composed of a flash memory (ROM).

The first heartbeat transmission/reception module 227 is used to generate and transmit/receive a heartbeat, thus the predetermined frequency of the heartbeat is set to the most recent heartbeat frequency.

The service request signal reception module 221 is used to receive a plurality of service request signals from the user's end 210.

The recording module 222 is used to record the transmitting times of a plurality of service request signals.

The calculation module 223 is used to calculate the frequency of the most recent service request signal based on the transmitting times of the plurality of service request signals.

The comparison module 224 is used to compare the most recent heart beat frequency and the frequency of the most recent service request signal.

The first signal synchronization module 228 is used to transmit a synchronization signal to a backup host 230 when the most recent heartbeat frequency and the frequency of the most recent service request signal are not in the same state as shown in the frequency correspondence table.

The first processing module 225 is used to regulate the most recent heart beat frequency of the host to the current heartbeat frequency corresponding to the frequency range of the most recent service request signal in the frequency correspondence table when the most recent heartbeat frequency and the frequency of the most recent service request signal are not in the same state as shown in the frequency correspondence table.

The backup host 230 include: a second heartbeat transmission/reception module 232, a second signal synchronization module 236, and a second processing module 234.

The second heartbeat transmission/reception module 232 is used to receive the heartbeat transmitted from the first heartbeat transmission/reception module 227, and then transmit the heartbeat back to the first heartbeat transmission/reception module 227, thus making the backup host 230 keep in contact with the host 220.

The second signal synchronization module 236 is used to receive the synchronization signal transmitted from the first signal synchronization module 228, and transmit back a certified regulation signal.

The second processing module 234 is used to regulate synchronously with the first processing module 225 the most recent heartbeat frequency, so that the frequencies of the heartbeats transmitted and received by the first heartbeat transmission/reception module 227 and the second heartbeat transmission/reception module 232 are identical.

Finally, refer to FIG. 3, which shows a frequency correspondence table used in regulating the heartbeat frequency of the host based on the frequency requested by the user according to an embodiment of the invention. State 1 of the frequency correspondence table indicates that if in the time duration of 5 consecutive heartbeats the backup host 230 does not receive any heart beats from the host 220, then it determines that the host 220 is in a machine-down state. Thus, the backup host 230 takes over the operation of the host 220.

Assuming that the heartbeat frequency preset by the user is 50 times/sec, and the frequency of service request signal from the user end 210 is 100 times/sec, then the first processing module 225 and the second processing module 234 must adjust and increase the frequency of the host heartbeat to 850 times/sec.

If the heartbeat frequency of the host cannot be regulated automatically, then when the host 220 is in the machine-down state, it would take the backup host 230 more than 0.1 second to determine that the host 220 is in the machine-down state, taking into consideration that the heartbeat frequency of the host is 50. As such, in this duration, there are as high as 100 service requests which cannot be responded to.

Through the application of the invention, the heartbeat frequency of the host can be adjusted automatically to 850 times/sec, so it takes the backup host only 0.00588 second to determine that the host 220 is in a machine-down state. Then the backup host 230 can immediately take over the operation of the host 220, so that the number of times the service request signals are not responded to is drastically reduced to 5 times (0.00588×1000=5.88), which is considerably less than the previous 100 times. Thus the system operation efficiency can be significantly increased.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for regulating real-time the heartbeat frequency of the host according to the user-requested frequency by making use of a Cluster System, including at least a host and a backup host, which are kept in touch with each other through a heartbeat transmitted between each other, so that the frequency of the heartbeat can be regulated by a service request signal sent from the user's end, comprising the following steps:

establishing a frequency correspondence table;

setting said heartbeat frequency to a most recent heartbeat frequency, so that signals are transmitted at the most recent heartbeat frequency between the host and the backup host;

recording the transmitted times of a plurality of service request signals, thus calculating a frequency of the most recent service request signal;

checking through said frequency correspondence table, when said most recent heartbeat frequency and the frequency of the most recent service request signal are not in the same state, then a synchronization signal is transmitted from said host to said backup host;

upon certifying the receipt of the synchronization signal by said backup host, transmitting a certified regulation signal back to said host; and regulating by said host and said backup host synchronously the most recent heartbeat frequency.

2. The method for regulating real-time the heartbeat frequency of the host according to the user-requested frequency by making use of a Cluster System as claimed in claim 1, wherein said frequency correspondence table is composed of a plurality of rows each representing a respective state, with each state containing said frequency range of a service request signal and a corresponding current heartbeat frequency of the host.

3. The method for regulating real-time the heartbeat frequency of the host according to the user-requested frequency by making use of a Cluster System as claimed in claim 1, wherein said most current heartbeat frequency of the host is set manually by the user.

4. The method for regulating real-time the heartbeat frequency of the host according to the user-requested frequency by making use of a Cluster System as claimed in claim 1, wherein said step of recording the transmitted times of a plurality of service request signals, thus calculating the frequency of the most recent service request signal further comprising the following steps:

recording the transmitting times of said plurality of service request signals;

calculating the time intervals between each of said respective transmitted service request signals;

calculating the sum of each of said respective time intervals;

dividing the sum of said respective time intervals by the numbers of the service request signals, thus obtaining an average time interval between each of said transmitted service request signals; and setting the frequency of said most recent service request signal to the reciprocal of said average time interval between the transmitted signals.

5. The method for regulating real-time the heartbeat frequency of the host according to the user-requested frequency by making use of a Cluster System as claimed in claim 1, wherein when said most recent heartbeat frequency of the host and said frequency of the most recent service request signal belong to the same state, then said most recent heartbeat frequency of said host remains unchanged.

6. The method for regulating real-time the heartbeat frequency of the host according to the user-requested frequency by making use of a Cluster System as claimed in claim 1, wherein the step of regulating by said host and said backup host synchronously the most recent heartbeat frequency is to regulate said most recent heartbeat frequency to the current heartbeat frequency corresponding to the frequency range of the most recent service request signal according to the frequency correspondence table.

7. A system for regulating real-time the heartbeat frequency of the host according to the user-requested frequency, comprising:
  a host, which is composed of the following:
    a storage module, used to store a frequency correspondence table;
    a first heartbeat transmission/reception module, used to generate and transmit/receive a heartbeat, thus the predetermined frequency of said heartbeat is set to the most recent heartbeat frequency;
    a service request signal reception module, used to receive a plurality of service request signals transmitted from the user;
    a recording module, used to record the transmitting times of said plurality of service request signals;
    a calculation module, used to calculate the frequency of the most recent service request signal based on the recorded transmission times of said plurality of service request signals;
    a comparison module, used to compare the frequency of said most recent heartbeat to the frequency of said most recent service request signal;
    a first signal synchronization module, used to transmit a synchronization signal to the backup host, when the frequency of said most recent heartbeat and the frequency of said most recent service request signal are not in the same state as shown in the frequency correspondence table; and
    a first processing module, used to regulate said most recent heartbeat frequency to the current heartbeat frequency corresponding to the frequency range of the most recent service request signal as shown in said frequency correspondence table;
  a backup host, which is composed of the following:
    a second heartbeat transmission/reception module, used to receive said heartbeat transmitted from said first heartbeat transmission/reception module, and then transmit said heartbeat back to said first heartbeat transmission/reception module, thus making said backup host keep in contact with said host;
    a second signal synchronization module, used to receive said synchronization signal transmitted from said first signal synchronization module, and transmit back a certified regulation signal; and
    a second processing module, used to regulate synchronously with said first processing module said most recent heartbeat frequency, so that frequencies of the heartbeats transmitted and received by said first heartbeat transmission/reception module and said second heartbeat transmission/reception module are identical.

8. The system for regulating real-time the heartbeat frequency of the host according to the user-requested frequency as claimed in claim 7, wherein said system is a cluster system.

9. The system for regulating real-time the heartbeat frequency of the host according to the user-requested frequency as claimed in claim 7, wherein said storage module is composed of a flash memory (flash ROM).

10. The system for regulating real-time the heartbeat frequency of the host according to the user-requested frequency as claimed in claim 7, wherein said frequency correspondence table is composed of a plurality of rows each representing a respective state, with each state containing the frequency range of a service request signal and a corresponding current heartbeat frequency of the host.

11. The system for regulating real-time the heartbeat frequency of the host according to the user-requested frequency as claimed in claim 7, wherein said most recent heartbeat frequency of the host is set manually by the user.

* * * * *